United States Patent [19]

Casse et al.

[11] Patent Number: 4,844,222
[45] Date of Patent: Jul. 4, 1989

[54] LOCKING ASSEMBLY FOR HYDROKINETIC DEVICE SUITABLE FOR AUTOMOBILE TRANSMISSION

[75] Inventors: Pierre Casse, Ermont; René Billet, Lamorlaye, both of France

[73] Assignee: Valeo, Paris, France

[21] Appl. No.: 143,196

[22] Filed: Jan. 13, 1988

[30] Foreign Application Priority Data

Jan. 19, 1987 [FR] France ................................ 8700494

[51] Int. Cl.4 .......................... F16D 3/14; F16D 47/02
[52] U.S. Cl. ................................. 192/3.28; 192/106.2; 464/68
[58] Field of Search ...................... 192/3.28, 3.29, 3.3, 192/3.31, 106.1, 106.2; 464/68

[56] References Cited

U.S. PATENT DOCUMENTS

| 4,410,075 | 10/1983 | Caray et al. | 192/106.2 |
| 4,555,009 | 11/1985 | Habel et al. | 192/106.1 |
| 4,580,668 | 4/1986 | Pickard et al. | 192/3.29 |
| 4,655,337 | 4/1987 | Carmillet et al. | 192/106.2 |
| 4,674,992 | 6/1987 | Carmillet et al. | 192/106.2 |
| 4,685,896 | 8/1987 | Carmillet et al. | 192/106.1 |

FOREIGN PATENT DOCUMENTS

| 0172100 | 2/1986 | European Pat. Off. . |
| 0174233 | 3/1986 | European Pat. Off. . |
| 3236621 | 2/1984 | Fed. Rep. of Germany . |
| 3322374 | 1/1985 | Fed. Rep. of Germany . |
| 2549180 | 1/1985 | France . |

*Primary Examiner*—Rodney H. Bonck
*Assistant Examiner*—David A. Testardi
*Attorney, Agent, or Firm*—Charles E. Brown; Charles A. Brown

[57] ABSTRACT

The invention is concerned with a hydrokinetic device comprising a locking assembly adapted to provide a direct mechanical connection between its input element and its output element. According to the invention, this locking assembly comprises between a flange forming a piston and a counter flange, two discs each engaged with a hub with predetermined play, with, for the configuration of the assembly at rest, an alternate disposition in which one of the discs abuts the hub circumferentially in one circumferentially in the opposite circumferential direction. Such an arrangement is particularly applicable to an automobile transmission.

9 Claims, 4 Drawing Sheets

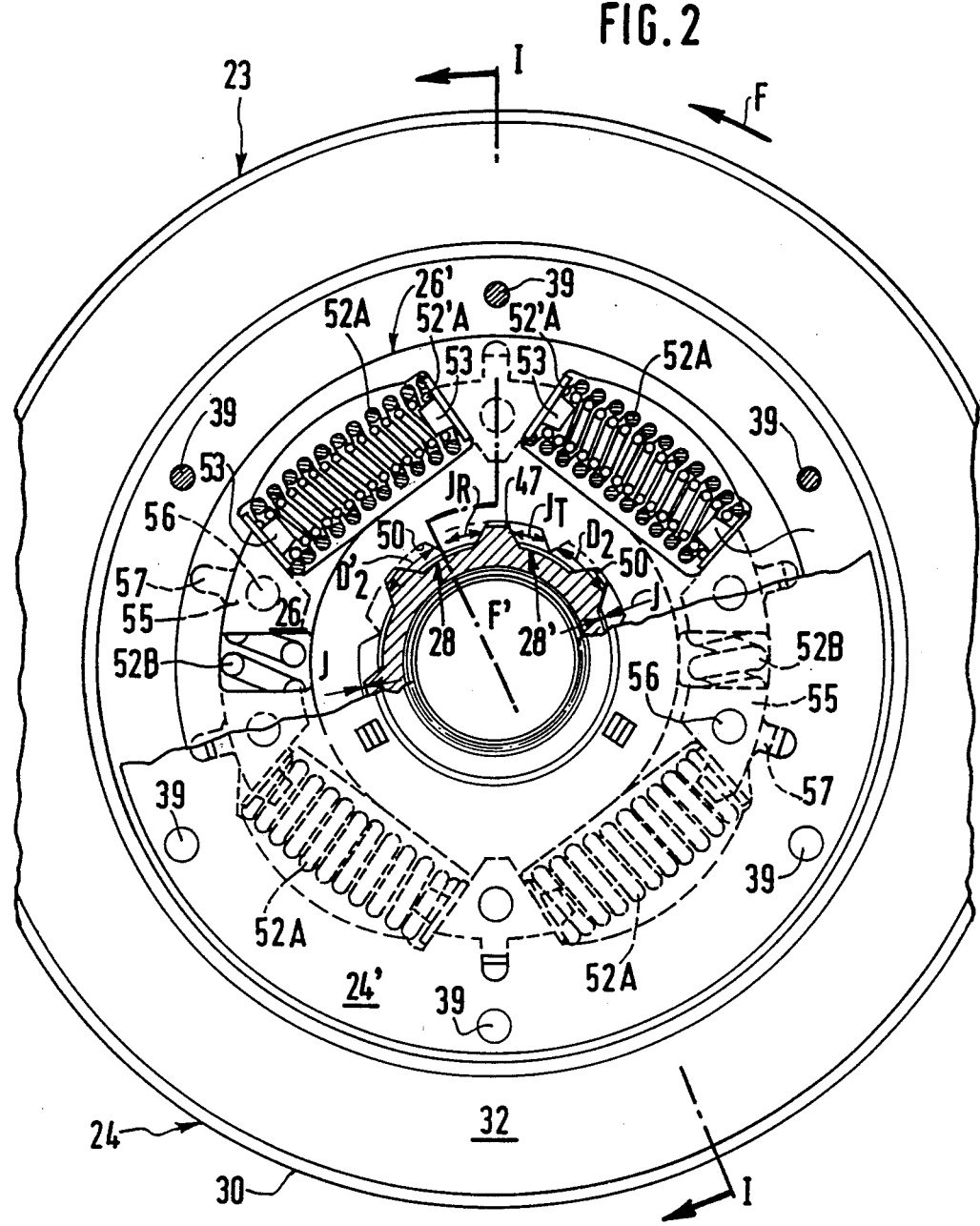

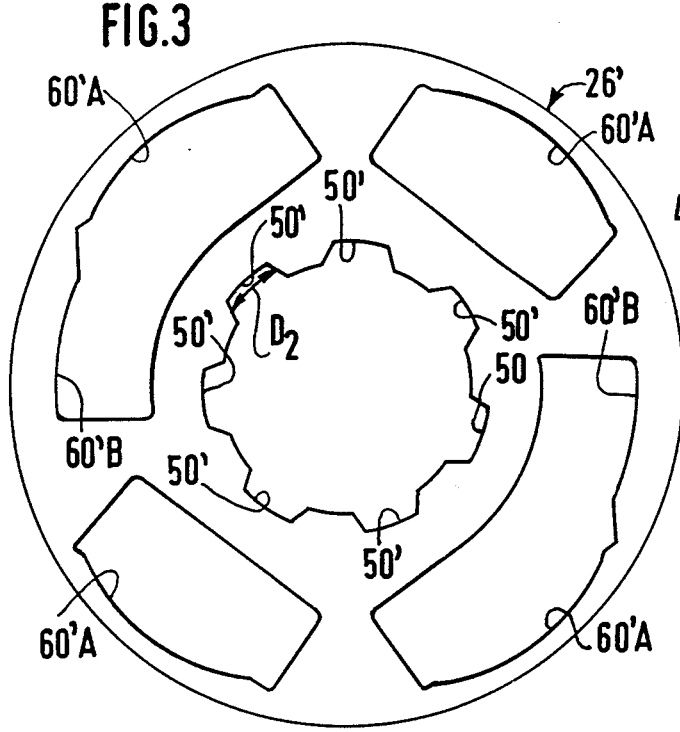
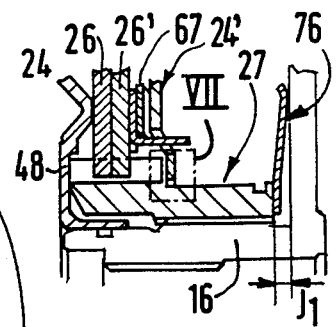
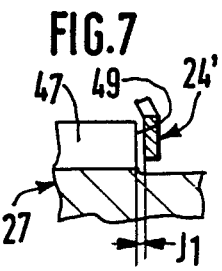
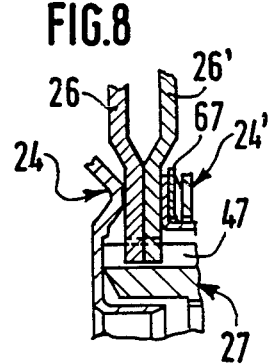
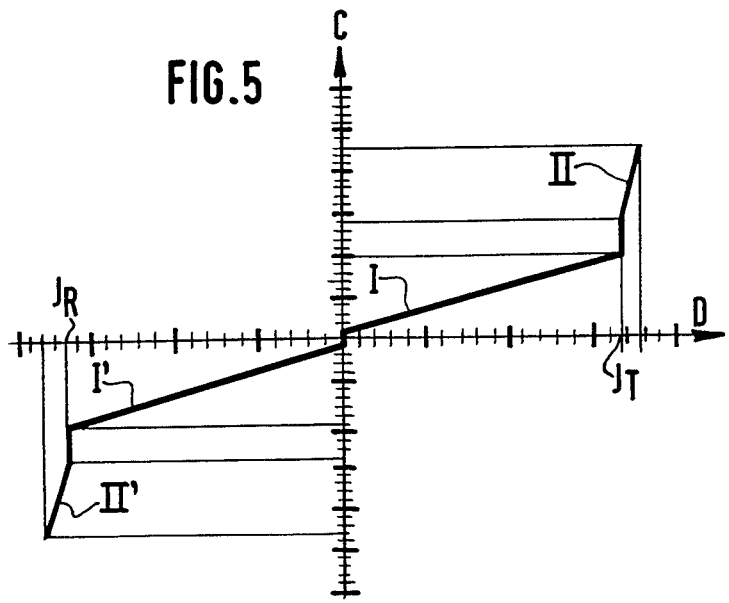
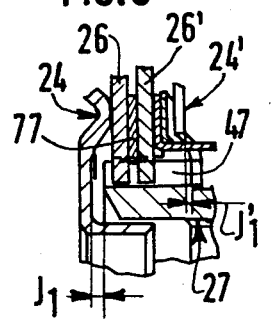

LOCKING ASSEMBLY FOR HYDROKINETIC DEVICE SUITABLE FOR AUTOMOBILE TRANSMISSION

FIELD OF THE INVENTION

The present invention relates generally to hydrokinetic devices such as torque converters or couplers, and concerns more precisely hydrokinetic devices which have a locking assembly capable of creating the condition commonly called "lock-up", in which the hydrokinetic device is put out of action.

DESCRIPTION OF THE PRIOR ART

When such a locking assembly is designed to form part of a device for torsion damping, it generally comprises a disc, located annularly around its hub, and extending in all directions transversely with respect to the hub, and integral in rotation therewith, and elastic means with a circumferential action, interposed circumferentially between, on the one hand, an axially movable flange forming a piston (or elements integrally in rotation with this) and, on the other hand, the said disc.

Such a device may be unsatisfactory when there is a simultaneous requirement that, on the one hand, the maximum angular travel possible between the two coaxial parts should be relatively large and, on the other hand, the corresponding couple should itself be relatively large.

In French patent application published under No. 2,568,642, it was proposed that, in order to increase the angular travel between the two coaxial parts mounted to rotate with respect to one another, the disc belonging to one of these should be divided, and between the two discs thus formed and the corresponding hub, means of engagement having some play should be disposed, with the configuration of the assembly at rest having an alternate disposition in which the means of engagement having some play between one of these discs and the hub are abutted circumferentially in one circumferential direction, whilst that between the other of these discs and the hub are abutted circumferentially in the opposite circumferential direction.

SUMMARY OF THE INVENTION

The object of the present invention is, in a general manner, the application of such an arrangement to a locking assembly for a hydrokinetic device.

More particularly, it has as a primary object a locking assembly for a hydrokinetic device, such as a torque converter or a coupler which is characterised in that it carries a combination, between a completely annular flange serving as a piston within such a hydrokinetic device and a counter flange integral in rotation with said annular flange, two discs disposed annularly around a hub, and extending transversely in all directions with respect to the hub, each engaging with the said hub by a means of engagement having some play whilst being completely free axially with respect to this hub, with the configuration of the assembly at rest having an alternate disposition in which the means of engagement having some play between one of these discs and the hub are abutted circumferentially in one circumferential direction, whilst that between the other of these discs and the hub are abutted circumferentially in the opposite circumferential direction, and elastic means with circumferential action interposed circumferentially between, on the one hand, the said flange and the said counter flange, and on the other hand, the said discs.

The invention also provides a hydrokinetic device, such as a torque converter or coupler for example, equipped with a locking assembly.

Since the two discs used each intervene selectively in a given circumferential direction, the corresponding angular travels between the one or other of these discs and the flange or counter flange with which they are associated are additive, in such a way that, as desired, the total angular travel between the two coaxial parts can advantageously be relatively large, and at the same time the couple transmitted as a result of such an angular travel can itself also be relatively large.

In a customary manner, there is a defined radial clearance between each of these two discs and the hub which they surround.

An axial clearance is provided between the hub and the flange or the associated counter flange, in such a way that the coaxial part to which this flange and this counter flange belong will not be restrained axially by this hub, and preferably it has a certain ability to move with respect to the said hub, and thus with respect to the axis of the assembly.

It is therefore preferable to take advantage of the freedom of movement which these discs already have with respect to the hub because their means of engagement have some play with the latter in order that, conjointly with the axial clearance provided for this purpose, the flange forming a piston is able to move to a greater or lesser extent with respect to the hub, and so to apply itself better, in the clutched phase, against the input element of the hydrokinetic device, in practice a transverse wall of the casing thereof, improving its surface of contact with this input element, and so improving the desired clutching action.

BRIEF DESCRIPTION OF THE DRAWINGS

FIG. 2, is a view, partly in elevation and partly in transverse section, along the broken line II—II in FIG. 1 of this locking assembly;

FIG. 3 is a view in elevation of one of the discs which it comprises, shown separately;

FIG. 5 is a block diagram showing this operation;

FIG. 6 is a partial view in axial section corresponding to FIG. 1, showing a different mounting of the locking assembly according to the invention;

FIG. 7 shows, on a larger scale, the detail in FIG. 1 referred to in the insert VII in this FIG. 6;

FIGS. 8 and 9 are partial views in axial section which corresponding to FIG. 1, each relate respectively to a different embodiment.

DESCRIPTION OF THE PREFERRED EMBODIMENTS

Figure 1:
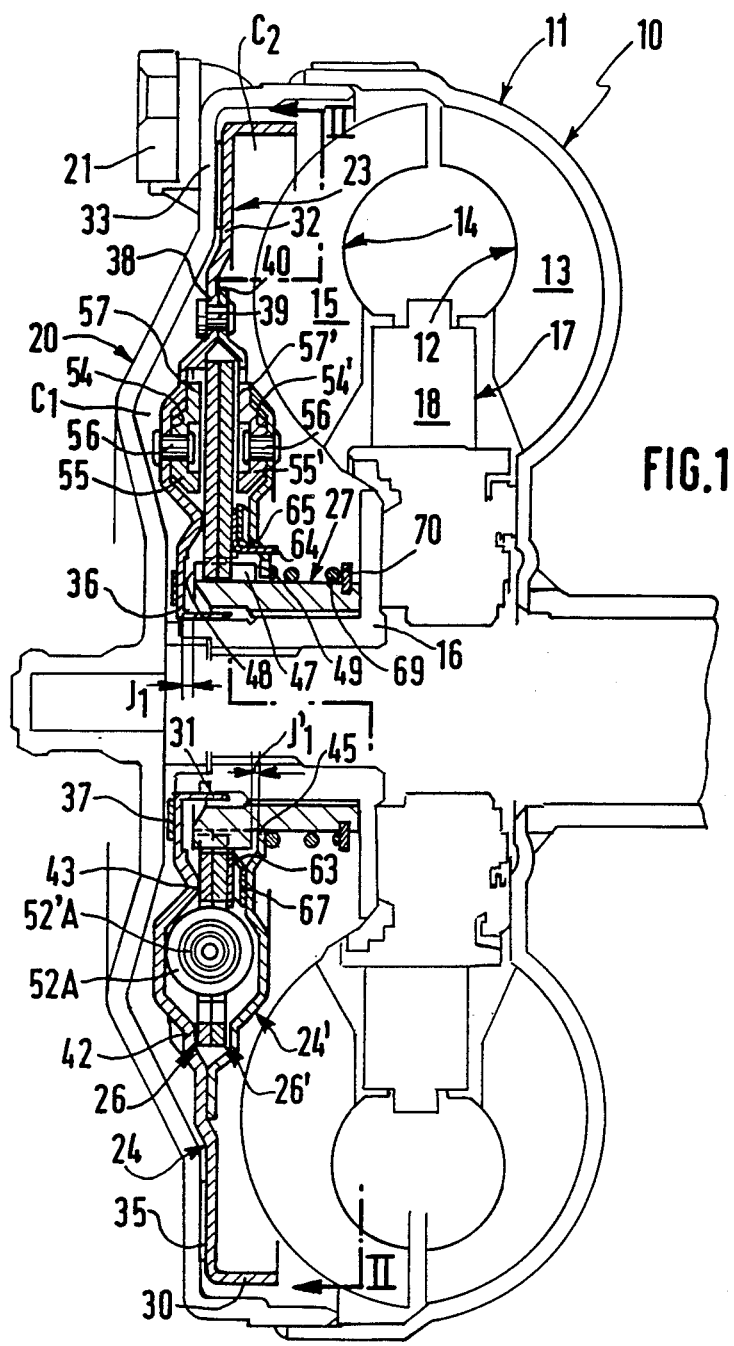
FIG. 1 is a view in axial section along the broken line I—I of FIG. 2, of a locking assembly according to the invention, and schematically, of a hydrokinetic device to which it can be fitted.

In FIG. 1, a hydrokinetic device is shown with the general reference 10.

In known manner, this hydrokinetic device 10 comprises, facing one another in a casing 11, an impeller wheel 12, with vanes 13, which in practice is integral with the casing 11, being carried on the internal face of one of the transverse walls of the casing, and a turbine wheel 14, with vanes 15, which in practice is integrally in rotation with a hub 16.

The device also comprises as a torque converter, in the embodiments shown, a reactor wheel 17, with vanes 18, between impeller wheel 12 and turbine wheel 14, on the periphery of these with the smallest diameter.

In practice, casing 11 of this hydrokinetic device 10 constitutes the input element, the transverse wall 20 of this casing opposed to impeller wheel 12 being adapted, by the studs 21 and a vane which is not shown, to be integrally in rotation with a first shaft, in practice a driving shaft, and the hub 16 of its turbine wheel 14 constitutes the output element, this hub 16 being intended to be integrally in rotation, for example through a mounting with splines, with a second shaft, in practice a driven shaft.

Such arrangements are well known and, as they are not part of the present invention, will not be described in more detail here.

In an equally well known manner, the hydrokinetic device 10 incorporates, within its casing 11, a locking assembly 23 between the transverse wall 20 of the casing and the turbine wheel 14.

Figure 4A:
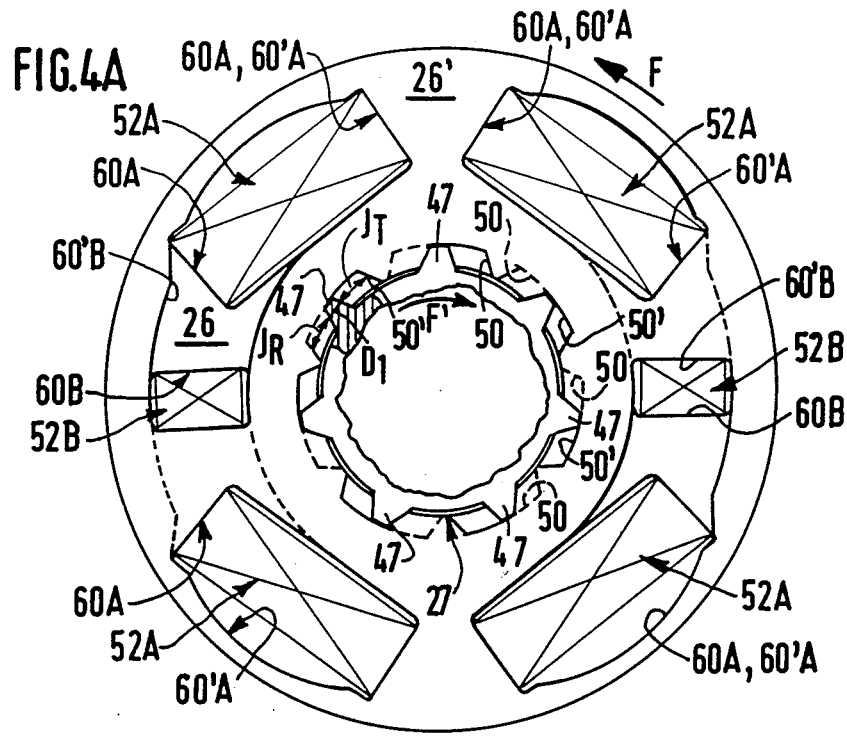
FIGS. 4A, 4B, are views which, based on that of FIG. 3, illustrate the superposition of two discs used in the locking assembly according to the invention, in two successive stages of operation of the assembly.

According to the invention, this locking assembly 23 comprises, in combination, a completely annular flange 24 acting as a piston within its casing 11, and a counter flange 24', also completely annular and integral in rotation with flange 24; between these flanges two discs 26, 26' disposed annularly around a hub 27, and extending transversely in all directions with respect to this, which are each engaged with the said hub 27, at their internal peirphery, by engagement means having some play 28, 28', whilst being free axially with respect to this hub 27, with, in the rest position of the assembly, such as is shown in FIGS. 2 and 4A, an alternate arrangement in which, as described in detail later, the engagement means 28, 28' between one of these discs 26, 26' and hub 27 are abutted circumferentially in one circumferential direction whilst those between the other disc 26, 26' and hub 27 are abutted circumferentially in the opposite circumferential direction, and as will also be described in more detail later, elastic means with circumferential action, which are interposed circumferentially between, on the one hand, flange 24 and counter flange 24' and, on the other hand, the said discs 26, 26'.

At its external periphery, that is to say at its periphery with the largest diameter, flange 24 has annularly, to stiffen it, an axial raised edge 30 extending axially in the direction away from the transverse wall 20 of the casing 11. On its internal perhphery, that is to say on its periphery with the smallest diameter, it carries an axial raised edge 31, extending in the same direction, to make a sealed engagement with hub 16 of the turbine wheel 14.

Near its external periphery, flange 24 forms annularly, essentially transversely with respect to the axis of the assembly, a flat region 32 through which it is meant to cooperate in axial application with the transverse wall 20 of casing 11, which is itself provided, for this purpose, with a transverse flat region 33. A friction lining 35 is located between these regions 32 and 33.

In the embodiments shown, flange 24 likewise has, near its internal periphery, a flat region 36 which, in case it is brought in contact at this level with the transverse wall 20 of casing 11 as a result of any deformations due to the pressure of the fluid being used, carries on the side towards this transverse wall 20 a washer 37 of synthetic material intended to prevent a metal to metal contact with the wall.

Flange 24 also has annularly, in its middle zone, for the axial support of counter flange 24', an essentially flat region of support 38, on which by means of rivets 39 suitably distributed circularly, counter flange 24' is fastened by an essentially flat region of support 40 which it presents annularly at its external periphery.

In its middle zone flange 24 has annularly, for the axial support of the disc 26, 26' which is nearest (in this case disc 26), two distinct support regions 42, 43, which are disposed radially at a distance fron one another, whilst extending essentially in the same transverse plane with respect to the axis of the assembly, and which are adapted to provide supports for zones of this disc 26 near its internal and external peripheries.

Counter flange 24' has annularly, at its internal periphery, near hub 27 which it surrounds, an essentially flat region 45.

In the embodiments shown, the two discs 26, 26' are identical with one another, one being simply turned through 180° with respect to the other by rotation around an axis perpendicular to the axis of the assembly. In the embodiment shown in FIGS. 1 to 5, these discs are flat pieces, made simply by cutting from a metal blank, and mounted in contact with one another over their whole surface.

By way of example, one of these discs, namely disc 26' is shown separately in FIG. 3.

To form the engagement means 28, 28' with discs 26, 26' the hub 27, which surrounds hub 16 of turbine wheel 14 integrally in rotation with it, (for example by being engaged with it by a mounting with splines), and which is prolonged beyond the space delimited by flange 24 and counter flange 24', presents in this space, radially projecting from its external periphery, a set of teeth, comprising several teeth 47 regularly spaced circularly and elongated axially.

Suppose D1, measured angularly at mid-height, is the circumferential size of each of these teeth 47. For reasons given later, these teeth 47 conjointly form transversely at their ends, a transverse shoulder 48 towards flange 24, and a transverse shoulder 49 towards counter flange 24'.

To form the engagement means with some play 28, 28' with hub 27, the discs 26, 26' each have, on their internal periphery, a set of teeth formed by notches 50, 50' which are regularly distributed circularly and are equal in number to the teeth 47 of hub 27 with which teeth the discs 26, 26' are engaged.

Suppose D2, D'2 measured angularly at mid-depth, is the circumferential size of each of these notches 50, 50'.

This circumferential size D2, D'2 is larger than that of D1 of teeth 47 of hub 27. Let JR be the total angular play which results from this for disc 26 with respect to hub 27, and JT be the total angular play for disc 26'. Taking into account the fact that, as indicated previously, discs 26 and 26' are identical, in the embodiments shown the clearances JT, JR are equal. They could however be different, if so desired, in variants of the invention.

In the embodiments shown, the elastic means with circumferential action used consist of springs 52 of the coiled spring type all stretched out essentially tangential to a common circumference of the assembly and distributed in two distinct groups. A first group consists of relatively weak springs 52A, in this case four in number, essentially disposed in a cruciform arrangement. A second group consists of relatively strong springs 52B, in this case two in number, diametrically opposite one another, and alternating with two successive relatively weak springs 52A.

To house these springs 52, flange 24 and counter flange 24' each have a small annular channel 54, 54', in their middle zones and facing one another.

They also have, in various places, circumferential means of support for these springs 52. In the embodiments shown these consist of blocks 55, 55' with an entirely triangular shape, each fixed by a rivet 56, 56' on the flange 24 or counter flange 24', between two successive springs 52.

These support blocks 55, 55', in this case each have a spur 57, 57', directed radially away from the axis of the assembly, by which they are held by a complementary nick in flange 24 or counter flange 24', and by which they are wedged in rotation around their respective rivets 56, 56'.

In a variant, the circumferential means of support of the springs 52 on flange 24 and/or counter flange 24' can be provided simply by appropriate deformations of this flange 24 and/or counter flange 24'.

In the embodiments shown, each of the relatively weak springs 52A is duplicated, internally by a spring 52'A which is supported by the support blocks 55, 55' through use of the small cups 53. To house the springs 52, as well as to cooperate with them, the discs 26, 26' have openings; more precisely, for the relatively weak springs 52A, windows 60A, 60'A are provided.

For the relatively strong springs 52B, the openings simply consist of circumferential prolongations 60B, 60'B, in the same circumferential direction of openings 60A, 60'A.

The arrangements are such that, for the assembly in the rest position, FIGS. 2 and 4A, the relatively weak springs 52A have no clearance, and in practice are even slightly prestressed, both between the corresponding blocks of circumferential support 55, 55' of flange 24 and counter flange 24' and in the openings 60A, 60'A of the discs 26, 26' except, of course, for the two of them which are housed in the openings 60A, 60'A endowed with a circumferential prolongation 60B, 60'B, these two relatively weak springs 52A then being supported only on one of the discs 26, 26' in one circumferential direction and on the other in the opposite circumferential direction.

In the same way, if, in the rest position of the assembly, the relatively strong springs 52B are placed without clearance between the corresponding blocks 55, 55' of flange 24 and counter flange 24', being, in practice, prestressed, each has one support on one of the discs 26, 26' in one circumferential direction and on the other in the opposite circumferential direction.

Moreover, the arrangements are such that, for this rest position, the teeth 47 of hub 27 are circumferentially applied, in one circumferential direction, against the corresponding edge of the circumferential end of the notches 50, 50' of one of the discs 26, 26', and in the opposite circumferential direction, against the corresponding edge of the circumferential end of the notches 50, 50' of the other disc.

Figure 4B:
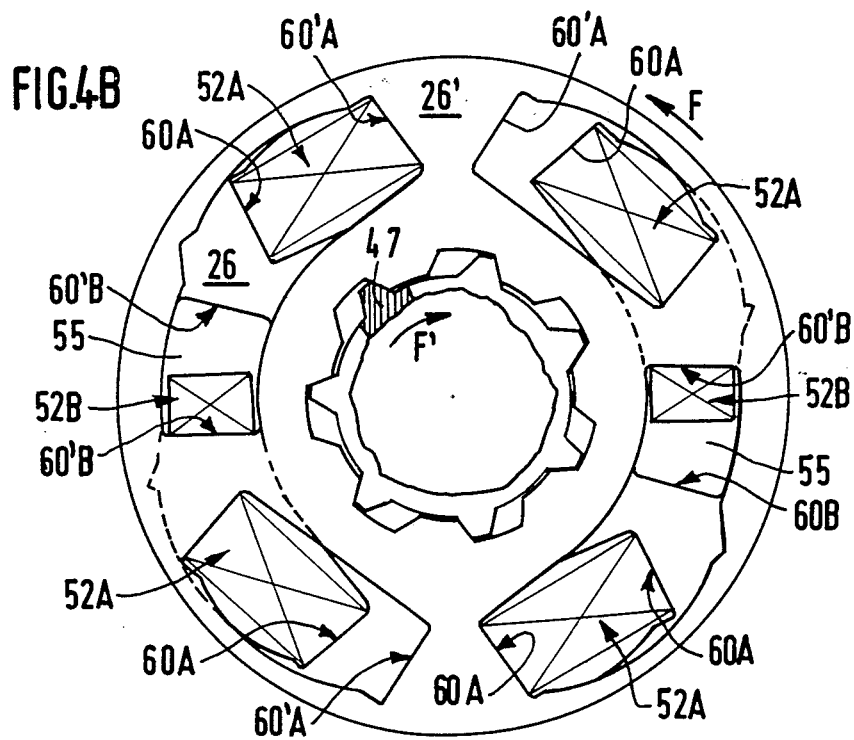

For example, if the direction of rotation of the assembly is that represented by arrow F in FIGS. 2, 4A and 4B, the teeth 47 of hub 27 are, in the rest position of the assembly, abutted circumferentially against those edges of the circumferential ends of the notches 50 of disc 26 which are upstream in relation to the direction of rotation, and they are abutted circumferentially against those edges of the circumferential ends of the notches 50' of disc 26' which are downstream in relation to this.

In other words, for this position, the total angular clearance JT, JR mentioned above occur respectively on the two sides of the teeth 47 of hub 27 in such a way that JR is downstream in the circumferential direction in relation to the direction of rotation of disc 26, and JT is upstream in the circumferential direction, for disc 26'. Moreover, and as is shown in FIG. 2, preferably, and because of their respective teeth, there is a radial clearance J between the discs 26, 26' and hub 27. Finally, in the embodiment shown, the locking assembly 23 comprises frictional means subjected to elastic means with axial action.

Besides the friction which can develop between, on the one hand, disc 26 and flange 24 and, on the other hand, the discs 26, 26', these frictional means comprise a friction washer 63, which, disposed on the surface of disc 26', on the side of this towards counter flange 24', is fixed angularly on this counter flange 24' by axial lugs 64 engaged for this purpose in passages 65 in the latter, the assembly being acted on by an elastic washer with axial action 67, in this case a corrugated washer of the type sold under the commercial name "ONDUFLEX", situated between this friction washer 63 and this counter flange 24'.

Due to the action of the elastic washer 67, the assembly consisting of the two discs 26, 26' is elastically urged towards flange 24 in such a way that the one of these two discs 26, 26' which is nearest axially to flange 24, disc 26, bears against it axially; in practice, at rest, disc 26 bears against one or other of the application regions 42, 43 provided for this purpose on flange 24.

Finally in the embodiment more particularly shown in FIGS. 1 and 5, on the outside of the space delimited by flange 24 and counter flange 24', axially-acting elastic means are provided which, intervening axially between hub 27 and counter flange 24', on the one hand, press, across this counter flange 24', flange 24 in its application against the flat region 33 of the transverse wall 20 of casing 11, and, on the other hand, press hub 27 in its application against the radial fastening of hub 16; however, at rest, an axial clearance J1 is left between flange 24 and the corresponding transverse shoulder 48 of hub 27, and an axial clearance J'1 is likewise left between the transverse shoulder 49 of this hub 27 and counter flange 24'.

These axially-acting elastic means consist of a spring 69, of the coiled spring type, applied to the hub 27 by a washer 70, which is elastically deformable radially, held by a groove provided for this purpose at the peripheral edge of hub 27.

In total, flange 24 of the locking assembly 23 separates the internal space of the casing 11 of the hydrokinetic device 10 into two chambers C1 and C2, chamber C1 being on the side of the transverse wall 20 of the casing 11 and chamber C2 being on the side of the turbine wheel 14.

By known communication means, the pressurized oil intended to feed the hydrokinetic device 10, enters the casing by its chamber C1 or its chamber C2. In the one case or the other it interacts with the impeller wheel 12, the turbine wheel 14, or the reactor wheel 17.

However, if, when it enters by chamber C1 these wheels are in active use, the oil pressure in this chamber C1 keeps the flange 24 of the locking assembly 23 at a distance from the transverse wall 20 of casing 11, by repelling the flange against spring 69 until it comes into abutment against transverse shoulder 48 of hub 27 which itself is abutted against the radial fastening 16 of turbine wheel 14. It is not the same when it enters by chamber C2.

In this case, chamber C1 is set to discharge, and under the dual action of spring 69 and the pressure of oil in chamber C2, flange 24, through the sliding of the locking assembly 23 on hub 27 comes to lie flat, with its region 32 against the region 33 of the transverse wall 20 of casing 11, which, by friction, ensures a direct mechanical entrainment of the output element, consisting of hub 16 of turbine wheel 14, by the input element, consisting of the said casing 11, consequently putting out of service the impeller wheel 12, the turbine wheel 14 and the reactor wheel 17.

Because of the axial clearance J'1 between counter flange 24' and transverse shoulder 49 of hub 27, it is quite certain that contact will occur between flange 24 and the transverse wall 20 of the casing, without interference of this transverse shoulder 49 of hub 27. Therefore the couple to be transmitted from the input element to the output element consequently passes through the locking assembly 23.

To the extent that this couple develops, flange 24 and counter flange 24' of this locking assembly 23, then integrally in rotation with casing 11, tend to entrain, through the intermediary of the various springs 52, in the direction of the arrow F of FIGS. 2, 4A and 4B, the discs 26 26' and, through these, the hub 27.

To simplify the explanation, it will be supposed that, in the reverse of this process, which involves a "pulling" action, that is to say an action in the course of which the rotational couple of the driving shaft is greater than that of the driven shaft, it is hub 27 which, going in a reverse circumferential direction, such as is represented by the arrow F' of FIGS. 2, 4A and 4B, tends to entrain, through the discs 26, 26'0 and the intermediary of the various springs 52, flange 24 and counter flange 24' of the locking assembly 23, and through these the casing 11.

Taking into account the dispositions described previously, hub 27, in such a "pulling" action entrains immediately, by its teeth 47, only the one disc 26, FIG. 4A, and at first only the relatively weak springs 52A yield elastically. This first phase of action continues until, (FIG. 4B) the angular clearance JT between the teeth 47 of hub 27 and the opposed edges of the circumferential ends of the notches 50' of disc 26' is used up.

In FIG. 5, in which the angular displacement between, on the one hand, hub 27 and, on the other hand, flange 24 and counter flange 24', is shown on the abscissa as D and the couple C transmitted from one to the other of the two parts of the structure in which they participate is shown on the ordinate, the curve representing this first phase of action is a straight line I, the slope of which depends upon the strength of the relatively weak springs 52A.

It will be appreciated that the angular travel, during this first phase of action, which corresponds to the angular clearance JT, and which is due only to disc 26', is relatively large since in practice it can be more than 15°, and the maximum corresponding couple is itself relatively large.

In a second phase, after the angular clearance JT is used up, the hub 27 entrains simultaneously, by its teeth 47, disc 26 and disc 26'. As a result of the entry into action of disc 26', relatively strong springs 52B also come into action, and also yielding elastically, after their initial prestress is overcome, they add their effects to those of the relatively weak springs 52A, which remain in action. In FIG. 5, this second phase of action is shown by a straight line II with a steeper slope than line I.

This second phase of action continues until there is a positive entrainment of flange 24 and counter flange 24' by discs 26, 26', for example by meeting the close coiled springs of one at least of the springs 52 circumferentially interposed between them.

In practice, the duration of elastic intervention of the relatively strong springs 52B is short, these springs 52B constituting a sort of elastic abutment.

If, at any instant, passing from a "pulling" action to a "retro" action, the rotational couple of the driving shaft becomes less than that of the driven shaft, the reverse process to the above develops with, at first, a relaxation of all the springs 52A, 52B, then, when the relatively strong springs 52B are relaxed, a relaxation of the relatively weak springs. In practice this relaxation is almost instantaneous and corresponds to a backward rotation of hub 27 relative to flange 24 and counter flange 24'.

In other words, during such a "retro" action, and when, always in relation to the same direction of movement of the vehicle concerned, the assembly continues, obviously, to turn in the circumferential direction represented by arrow F in FIGS. 2, 4A and 4B, the hub 27 then turns in the same circumferential direction as that represented by this arrow F with respect to the discs 26, 26'.

Consequently, after passing its initial position, it is disc 26' which it first entrains by itself, and it only entrains disc 26 with it after using up the corresponding angular clearance JR.

In the drawing of FIG. 5, the curves showing the actions are the lines I', II' corresponding to the previous ones but with their slopes inverted.

In the above, to simplify the explanation, the phenomenon of hysteresis which develops after the angular displacement between the coaxial parts concerned, because of the friction between them, has been ignored.

However, as is known, hysteresis leads to a difference, for a given angular displacement, between the value of the couple corresponding to an increasing displacement and that corresponding to a decreasing displacement.

During "pulling", the friction is at first that which develops between, on the one hand, disc 26 and disc 26', and, on the other hand, between disc 26 and flange 24, this disc being initially the first one entrained, then, when disc 26' is entrained in its turn, by the process described previously, the friction between disc 26 and flange 24 and between disc 26' and the friction washer 63 being involved.

During "retro" action, the friction is at first that and friction washer 63, between, on the one hand, disc 26' and friction washer 63, and, on the other hand, between disc 26' and disc 26, disc 26' being initally the first one entrained, then when disc 26 is in its turn entrained, the friction between disc 26 and flange 24 and between disc 26' and the friction washer 63 being involved.

In practice, when friction exists between disc 26 and flange 24, this friction is just as likely to develop because of the zone of application 43 of the flange, which is directly subjected to the action of the elastic washer 67, as it is to be due to its zone of application 42.

However, because of the axial force to which the flange 24 is subjected when the locking assembly 23 is in action, that is to say when it ensures a direct mechanical connection between the input and output elements of the hydrokinetic device 10, it can minimize the contact between disc 26 and the application zone 43 of this flange 24, even to the extent of a total loss of contact between these two parts in the region of this application zone 43, which then does not serve to limit any possible deformation of discs 26, 26'.

Then, for disc 26, only the friction resulting from the application zone 42 of flange 24 occurs, and this is exactly the reason why this application zone 42 has been provided, in a zone of weak deformation of flange 24. In all cases, taking into account the diameters of the circumferences concerned and the corresponding contact surfaces, it can be arranged such that the friction from disc 26 is greater than that from disc 26'. In such a case, the hysteresis effect with disc 26 is greater than that with disc 26'.

This is preferable during "pulling", and this is the reason why that of the discs 26, 26' which intervenes in "pulling", namely disc 26, is the disc which, with respect to the other, is axially placed on the side towards flange 24.

However, in a variant, it is possible by disposing the discs 26, 26' differently, to arrange that the hysteresis due to disc 26' is greater than that due to disc 26.

In this case, that of the discs 26, 26' which, with respect to the other, is axially placed on the side towards flange 24 is the one which intervenes in "retro" action. In all cases, hysteresis can thus, if required, be different in "pulling", and in "retro", whether it be greater during "pulling" or during "retro".

Besides, during operation, and taking into account the engagement with play between discs 26, 26' and hub 27, and of their radial clearance J with respect to this, these discs 26, 26' can oscillate a little with respect to hub 27, against spring 69; the same applies to flange 24.

This can therefore preferably be best applied to the application region 33 of the transverse wall 20 of casing 11.

Taking into account the differences in radius of the internal and external peripheries of flange 24, it is still the same in the alternative mounting shown in FIGS. 6 and 7, in which the above mentioned spring 69 is omitted, the axially-acting elastic means provided to press this flange 24 in its application against the transverse wall 20 of the casing intervening between the hub 27 and the radial fastening of hub 16 of the turbine wheel 14 and thus urging hub 27 against flange 24.

In all cases, as is easy to understand, the axial clearance J'1 left between counter flange 24' and the transverse shoulder 49 of hub 27 facilitates the oscillation of discs 26, 26', and thus of flange 24, with respect to hub 27.

In the embodiment shown in FIGS. 6 and 7, the axially-acting elastic means consists of an elastic washer of the Belleville washer type 76.

Be that as it may, because of these elastic means, hub 27 of the locking assembly 23 moves axially, in use, with the other components, whilst in the forms of assembly described previously with reference to FIGS. 1 to 5, it remains axially fixed in abutment against the radial fastening of hub 16 of turbine wheel 14.

The axial clearance J1 necessary for such an axial displacement of the locking assembly 23 is thus situated between the hub 27 of this locking assembly 23 and the radial fastening of hub 16 of turbine wheel 14.

In the embodiment shown in FIG. 8, the two discs 26, 26' contact each other only by a part of their surfaces, situated axially subjected to the elastic washer 67, each of these two discs 26, 26' comprising at least two portions axially displaced with respect to one another, namely a portion near to their internal periphery, the one with which they are in contact with one another, and a portion forming their moving part.

In the embodiment shown in FIG. 9, the discs 26, 26' are flat, as in the embodiments shown in FIGS. 1 to 5, but they are axially separated from one another by a friction washer 77.

In one case or another a preferred more exact control of the hysteresis is possible, and any effect of possible cutting irregularities on the disc 26, 26' outside the desired friction zone is preferably avoided.

The present invention is not limited to the embodiments described and shown, but encompasses all variants and/or combination of their various elements within the scope of the appended claims.

What is claimed is: :

1. A locking assembly for a hydrokinetic device, which locking assembly is disposed between a completely annular flange acting as a piston within the hydrokinetic device, and a counter flange integral in rotation with said annular flange, the assembly comprising two discs disposed annularly around a hub, and extending transversely with respect thereto, each disc being circumferentially engaged with the said hub by engagement means having predetermined play whilst being free axially with respect thereto, with, in the rest position of the assembly, an arrangement in which said engagement means between one of these discs and the hub abut circumferentially in one circumferential direction whilst those between the other disc and the hub abut circumferentially in the opposite circumferential direction, and elastic means with circumferential action interposed circumferentially between, on the one hand, the said flange and the said counter flange and, on the other hand, the said discs.

2. A locking assembly as claimed in claim 1, wherein, for an axial support of a nearest one of said discs, said annular flange comprises, annularly, two distinct support regions spaced radially from one another, one adapted to provide a support for said nearest disc in a zone thereof adjacent its internal periphery, and the other adapted to provide a support in a zone adjacent its external periphery.

3. A locking assembly as claimed in claim 1, wherein axially-acting elastic means are disposed between the discs and the counter flange operable to urge the assembly of said discs toward the flange such that the disc which is axially nearest to this flange bears axially against it.

4. A locking assembly as claimed in claim 1, wherein an axial clearance is provided between said hub and said counter flange.

5. A locking assembly as claimed in claim 1, wherein elastic means are provided between said hub and said counter flange.

6. A locking assembly as claimed in claim 1, wherein the two said discs are identical, one being displaced through 180° with respect to the other by rotation around an axis perpendicular to the axis of the assembly.

7. A locking assembly as claimed in claim 1, wherein the two discs are in contact with one another over an entire surface of one of their surfaces.

8. A hydrokinetic device comprising a casing and disposed therein an impeller wheel, a turbine wheel, and a locking assembly, the locking assembly having a hub integral in rotation with a hub of said turbine wheel; and wherein said locking assembly is constructed according to claim 3, and said axially-acting elastic means is disposed between the hub of the locking assembly and the hub of the turbine wheel.

9. A hydrokinetic device comprising a casing, and disposed therein an impeller wheel, a turbine wheel and a locking assembly, said locking assembly having a hub integral in rotation with a hub of said turbine wheel; and wherein said locking assembly is constructed according to claim 5, and the hub of said locking assembly abuts the radial fastening of the hub of said turbine wheel, and wherein, at rest, an axial clearance is provided between the annular flange of the locking assembly and its said hub.

* * * * *